United States Patent
Nitto et al.

(10) Patent No.: US 7,072,006 B2
(45) Date of Patent: Jul. 4, 2006

(54) LIQUID CRYSTAL DISPLAY DEVICE EQUIPPED WITH AN IMPROVED BACKLIGHT DEVICE

(75) Inventors: Eiji Nitto, Kawasaki (JP); Shinpei Nagatani, Kawasaki (JP); Hirofumi Miyamoto, Kawasaki (JP); Koshu Yonemura, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 166 days.

(21) Appl. No.: 10/097,780

(22) Filed: Mar. 14, 2002

(65) Prior Publication Data

US 2003/0025850 A1 Feb. 6, 2003

(30) Foreign Application Priority Data

Aug. 3, 2001 (JP) ................................. 2001-236400

(51) Int. Cl.
*G02F 1/1333* (2006.01)

(52) U.S. Cl. ........................................ 349/58; 362/31
(58) Field of Classification Search ................ 349/58, 349/65, 62, 61; 362/31
See application file for complete search history.

(56) References Cited

U.S. PATENT DOCUMENTS 6,512,557 B1 * 1/2003 Miwa ........................ 349/58

FOREIGN PATENT DOCUMENTS

| JP | 7-159780 | 6/1995 |
| JP | 9-219109 | 8/1997 |
| JP | 2000-19512 | 1/2000 |
| JP | 2000-076918 | 3/2000 |

* cited by examiner

*Primary Examiner*—Robert H. Kim
*Assistant Examiner*—Richard H Kim
(74) *Attorney, Agent, or Firm*—Greer, Burns & Crain, Ltd.

(57) ABSTRACT

A liquid crystal display device irradiates a light of a light source from a backside of a liquid crystal panel. A light-guiding plate provided under the liquid crystal panel guides the light of the light source to the liquid crystal panel by transmitting the light therethrough. An optical sheet is arranged between the liquid crystal panel and the light-guiding plate. A backlight housing accommodates the light-guiding plate and the optical sheet. The optical sheet has a protruding part extending outwardly from a periphery thereof. The backlight housing has an opening at a position corresponding to the protruding part.

3 Claims, 11 Drawing Sheets

LIQUID CRYSTAL DISPLAY DEVICE EQUIPPED WITH AN IMPROVED BACKLIGHT DEVICE

BACKGROUND OF THE INVENTION

1. Field of the Invention

The present invention generally relates to liquid crystal display devices and, more particularly, to a liquid crystal display device equipped with a backlight device that illuminates a liquid display part.

2. Description of the Related Art

First, a description will be given, with reference to FIG. 1, of a conventional liquid crystal display device. FIG. 1 is an exploded perspective view of a conventional liquid crystal display device.

A liquid crystal panel 1 of the liquid crystal display device, which displays information thereon, is accommodated in a housing 2 that also serves as a decorative board. A backlight device is provided under the liquid crystal panel 1 so as to make the liquid crystal display legible by illuminating from backside.

The backlight device has light sources 3, a light-guiding plate 4 and optical sheets 5a and 5b. The light sources 3, the light-guiding plate 4 and the optical sheets 5a and 5b are accommodated in a backlight housing comprising upper and lower housings 6a and 6b.

A light emitted from each of the light sources 3 propagates inside the light-guiding plate 4, and exits from a front surface of the light-guiding plate 4 toward the liquid crystal panel 1. A reflective panel 7 is provided on a side of the light-guiding plate 4 opposite to the light-guiding plate 4, and the light projected from each of the light sources 3 and incident on the light-guiding plate 4 exits only in a direction toward the liquid crystal panel 1.

The light that exits from the light-guiding plate 4 is irradiated onto the liquid crystal panel 1 after being subjected to a predetermined optical process such as diffusion or convergence by the optical sheets 5a and 5b. Thereby, the background of the liquid crystal panel 1 becomes bright moderately, which makes the display on the liquid crystal panel 1 legible.

Although the two optical sheets 5a and 5b are used in the device shown in FIG. 1, a single optical sheet may be used if a desired backlight effect can be obtained, or there may be a case where more than three optical sheets are used. Additionally, although the two light sources 3 are provided on opposite sides of the light-guiding plate 4 in FIG. 1, only one light source may be provided on one side.

In the structure of the backlight device shown in FIG. 1, each of the optical sheets 5a and 5b has the front surface and the back surface, and does not function correctly if it is mistakenly incorporated in a wrong direction. Therefore, it is necessary to check, after assembling the backlight device, whether the optical sheets 5a and 5b have been incorporated and whether their front and back surfaces face correctly.

However, after assembling the backlight device, the optical sheets 5a and 5b are covered by the liquid crystal panel 1 and the backlight housing 6a. Therefore, there is a problem in that it is difficult to check visually from outside, after the assembly of the backlight device, whether the optical sheets 5a and 5b are appropriately incorporated.

Here, if an ambient temperature of the liquid crystal display device is raised in an environmental test etc., the optical sheets 5a and 5b will expand thermally. Under such circumstances, there is a case in which a periphery of each of the optical sheets 5a and 5b shifts toward the center thereof without extending outwardly. In such a case, each of the optical sheets 5a and 5b deforms into a fine-wavy form as shown in FIG. 2B.

That is, if the gap between the backlight housing 6b and the light-guiding plate 4 is large, each of the optical sheets 5a and 5b makes a smooth deformation in which a center section protrudes as shown in FIG. 2A. However, if the gap is small as shown in FIG. 2B, each of the optical sheets 5a and 5b will deform into the wavy form having many fine waves. If the optical sheets 5a and 5b deform as shown in FIG. 2B, there is a problem in that a light passing through the optical sheets 5a and 5b is influenced and unevenness occurs in the backlight illumination.

Moreover, although a light-guiding plate 4 also expands in connection with the temperature rise, the light-guiding plate 4 deforms so that the center portion thereof is bent since the periphery thereof is fixed and the thickness thereof is larger than the thickness of the optical sheet and the light-guiding plate 4 has rigidity. Here, when the center portion of the light-guiding plate 4 bends in a direction to separate from the liquid crystal panel 1, the gap between the liquid crystal panel 1 (the upper backlight housing 6b) and the light-guiding plate 4 expands only in the center portion. Therefore, the space within which the optical sheets 5a and 5b can deform is expanded, and there is a problem in that a magnitude of deformation further increases.

Each of the light sources 3 shown in FIG. 1 consists of a fluorescence tube, which generally uses an ultraviolet radiation of mercury. FIG. 3 is a perspective view of the light source 3 that consists of a fluorescence tube. In the light source 3, opposite ends of a fluorescence tube 3a is attached to fluorescence tube support members 3b, and a reflector 3c is provided around the fluorescence tube 3a. The reflector 3c has a function to reflect a light emitted from the fluorescence tube 3a and converge the reflected light onto an incident light end surface of the light-guiding plate 4. The fluorescence tube 3a also emits heat when emitting a light. Such a heat is released through the reflector 3c and the fluorescence tube support members 3b.

As mentioned above, since an ultraviolet radiation of mercury is used for the fluorescence tubing 3c, mercury vapor is enclosed within a glass tube, which constitutes the luminescence portion. Here, if a wall-surface temperature of the glass tube changes, a mercury vapor pressure inside the glass tube changes, which results in a change in the luminous efficiency. Such a change in the luminous efficiency takes a peak value (maximum) at a certain temperature if the glass wall surface. Therefore, in order to maintain a high luminous efficiency, it is necessary to maintain the wall surface of glass tube at a constant temperature.

Moreover, a cold cathode tube can also be used for the fluorescence tube. In such a case, when a cold cathode tube emits electrons, much electric power (=cathode drop voltage×tube current) near the cathode. Such an electric power is reflected to as a reactive power, and most parts of the reactive power are converted into heat. If the liquid crystal display device is enlarged and the intensity of luminescence of the backlight is raised, a cathode drop electrical potential difference and a tube current, which are the main components of a tubing electrical potential difference, will go up inevitably. Consequently, generation of heat of the fluorescence tube end section, which is the cathode section, will become larger relative to other part.

As mentioned above, generation of heat of the fluorescence tube-end portion, which is the cathode section, increases, the temperature near the fluorescence tube-end portion rises and creep may occur in a solder connecting a terminal and a lead wire. If creep occurs in a solder, it causes a poor connection, and there is a problem in that a reliability of dependability of a connection falls remarkably. Generally, a creep phenomenon starts to occur at 0.5 times the melting point of the material. Usually, since the melting point of a solder is 183° C., a half of the melting point is 91.5° C. It is appreciated from the experiments that if the temperature of the solder exceeds 100° C., the creep appears remarkably.

Moreover, when the temperature near the fluorescence tube-end portion rises, there is a problem in that heat deformation and thermal degradation occur in a resin member such as the light-guiding plate 4 or a plastic frame, which are members arranged around the fluorescence tube. In order to solve the problem caused by the generation of heat in such a fluorescence tube and to maintain the luminous efficiency at a high value, it is necessary to properly control a heat radiation from the fluorescence tube.

However, in the structure of the conventional light source 3, a heat is radiated from only the by reflector 3c which merely encloses the fluorescence tube 3a and the fluorescence tube support member, and the temperature control of the fluorescence tube and a peripheral portion thereof according to the heat radiation is not taken into consideration. Therefore, there is a problem in that the luminous efficiency of the fluorescence tube cannot be maintained in a good state.

SUMMARY OF THE INVENTION

It is a general object of the present invention to provide an improved and useful liquid crystal display device in which the above-mentioned problems are eliminated.

A more specific object of the present invention is to provide a liquid crystal display device having a backlight device including an optical sheet of which existence can be visually recognized from outside.

Another object of the present invention is to provide a liquid crystal display device having a backlight device including an optical sheet that is prevented from deformation due to thermal expansion.

A further object of the present invention is to provide a liquid crystal display device having a backlight device that can eliminate a problem caused by a heat of a light source.

In order to achieve the above-mentioned objects, there is provided according to one aspect of the present invention a liquid crystal display device irradiating a light of a light source from a backside of a liquid crystal panel, the liquid crystal display device comprising: the liquid crystal panel; a light-guiding plate provided under the liquid crystal panel for guiding the light of the light source to the liquid crystal panel by transmitting the light therethrough; at least one optical sheet arranged between the liquid crystal panel and the light-guiding plate; and a backlight housing accommodating the light-guiding plate and the optical sheet, wherein the optical sheet has a protruding part extending outwardly from a periphery thereof, and the backlight housing has an opening at a position corresponding to the protruding part.

According to the above-mentioned invention, present, the opening provided in the backlight housing serves as a housing window through which the protruding part of the optical sheet can be visually recognized after the liquid crystal display device is assembled. Thus, a defect in the liquid crystal display device, such as a fact that the optical sheet are forgotten to insert during an assembling operation, can be easily checked.

In the liquid crystal display device according to the present invention, a plurality of the optical sheets may be provided, and the protruding parts of the optical sheets may be located at different positions from each other. Accordingly, the protruding parts do not overlap with each other, and presence of all optical sheets can be checked visually. The protruding part may be provided at a position other than positions along a center line of the optical sheet. Accordingly, if the optical sheet is placed upside down, the protruding part cannot be aligned with the window of the housing. Thus, the fact that the optical sheet is assembled upside down can be checked visually.

Additionally, there is provided according to another aspect of the present invention a liquid crystal display device irradiating a light of a light source from a backside of a liquid crystal panel, the liquid crystal display device comprising: the liquid crystal panel; a light-guiding plate provided under the liquid crystal panel for guiding the light of the light source to the liquid crystal panel by transmitting the light therethrough; at least one optical sheet arranged between the liquid crystal panel and the light-guiding plate; and a backlight housing accommodating the light-guiding plate and the optical sheet, wherein the optical sheet is located within a gap formed between the backlight housing and the light-guiding plate, and a width of the gap at the center of the optical sheet is smaller than a width of the gap at an end of the optical sheet.

According to the above-mentioned invention, when the optical sheet expands thermally, the deformation of the optical sheet does not concentrate into the center portion since there is no space in which the deformation occurs. Thus, the optical sheet deforms along a relatively gentle curve, which prevents uneven illumination by the light passing through the optical sheet.

In the liquid crystal display device according to the above-mentioned invention, the backlight housing may have a protruding part formed in the middle of a surface facing the light-guiding plate, and a width of the gap at the center of the optical sheet may be equal to a distance between the protruding part and the light-guiding plate. Accordingly, dimensions of the space in which the optical sheet is placed can be easily set by forming the protruding part on the backlight housing. The protruding part may have a length equal to one fourth of a length of the optical sheet. Accordingly, the optical sheet tends to deform along the protruding part, which prevents generation of small waveform deformation in the optical sheet.

Additionally, there is provided according another aspect of the present invention a liquid crystal display device using a light of a light source as a backlight, the liquid crystal display device comprising: a liquid crystal panel; and a light-guiding plate provided under the liquid crystal panel for guiding the light of the light source to the liquid crystal panel by transmitting the light therethrough, wherein the light source includes a fluorescent tube and a reflector surrounding the fluorescent tube, and a configuration of a portion of the reflector surrounding a luminescence section of the fluorescent tube is different from a configuration of has a portion of the reflector surrounding an electrode section of the fluorescent tube.

According to the above-mentioned invention, different heat release characteristics can be provided to the portion of the reflector surrounding the luminescence section of the fluorescent tube and the portion of the reflector surrounding the electrode section of the fluorescent tube. Accordingly, the temperature of the fluorescent tube can be accurately adjusted, and the luminescence characteristic of the luminescent tube can be maintained at a high level.

In the liquid crystal display device according to the above-mentioned invention, a step part may be formed between the portion of the reflector surrounding the luminescence section of the fluorescent tube and the portion of the reflector surrounding the electrode section of the fluorescent tube, and a distance between the electrode section of the fluorescent tube and the reflector may be smaller than a distance between the luminescence section of the fluorescent tube and the reflector. Accordingly, an amount of heat released form the electrode section of the fluorescent tube can be larger than an amount of heat released from the luminescence section, which results in decrease in the temperature of the electrode section. Thus, the solder connecting part provided in the electrode section can be prevented from being affected by a high temperature.

In the liquid crystal display device according to the above-mentioned invention, the electrode section of the fluorescent tube may preferably be connected to a fluorescent tube support part having a heat conductivity equal to or greater than 0.5 [W/(m·K)]. The reflector may be made of a metal or a material having a heat conductivity substantially equal to a heat conductivity of a metal. Accordingly, an amount of heat released from the reflector is increased, which results in decrease in the temperature of the fluorescent tube.

Other objects, features and advantages of the present invention will become more apparent from the following detailed description when read in conjunction with the accompanying drawings.

DETAILED DESCRIPTION OF THE PREFERRED EMBODIMENTS

Figure 4A:
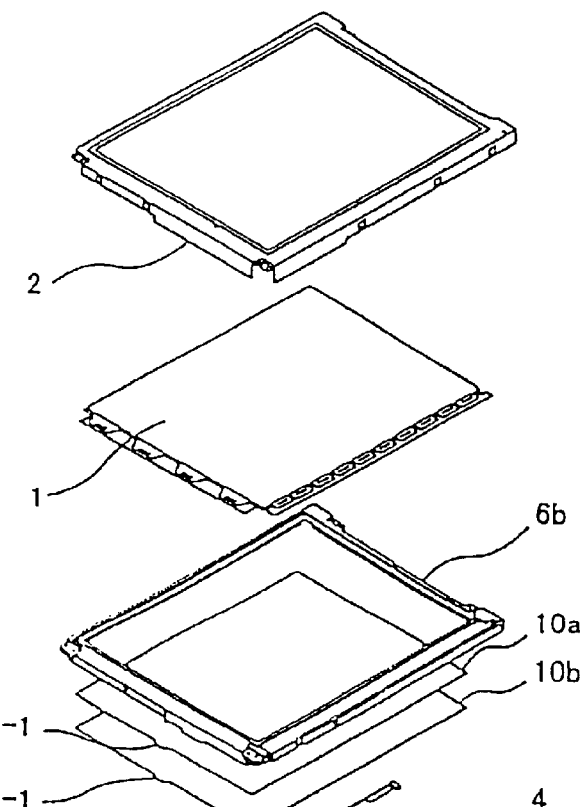
FIG. 4A is an exploded perspective view of a liquid crystal display device according to a first embodiment of the present invention.
Figure 4B:
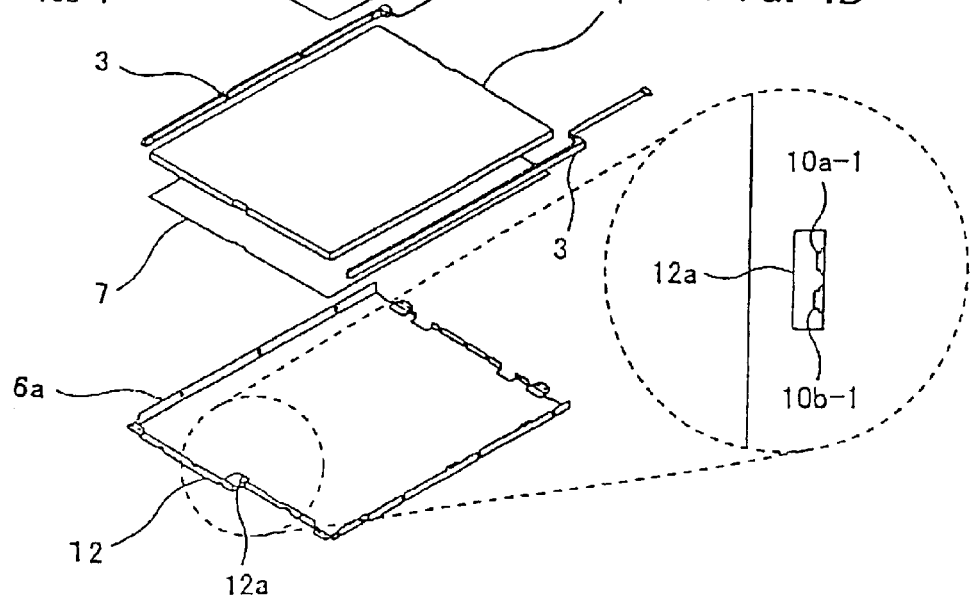
FIG. 4B is an exploded view of a part of a backlight housing shown in FIG. 4A.

A description will now be given, with reference to FIGS. 4A and 4B, of a first embodiment of the present invention. FIG. 4A is an exploded perspective view of a liquid crystal display device according to the first embodiment of the present invention. FIG. 4B is a plan view of a part of a backlight housing shown in FIG. 4A. In FIGS. 4A and 4B, parts that are the same as the parts shown in FIG. 1 are given the same reference numerals, and descriptions thereof will be omitted.

Figure 1:
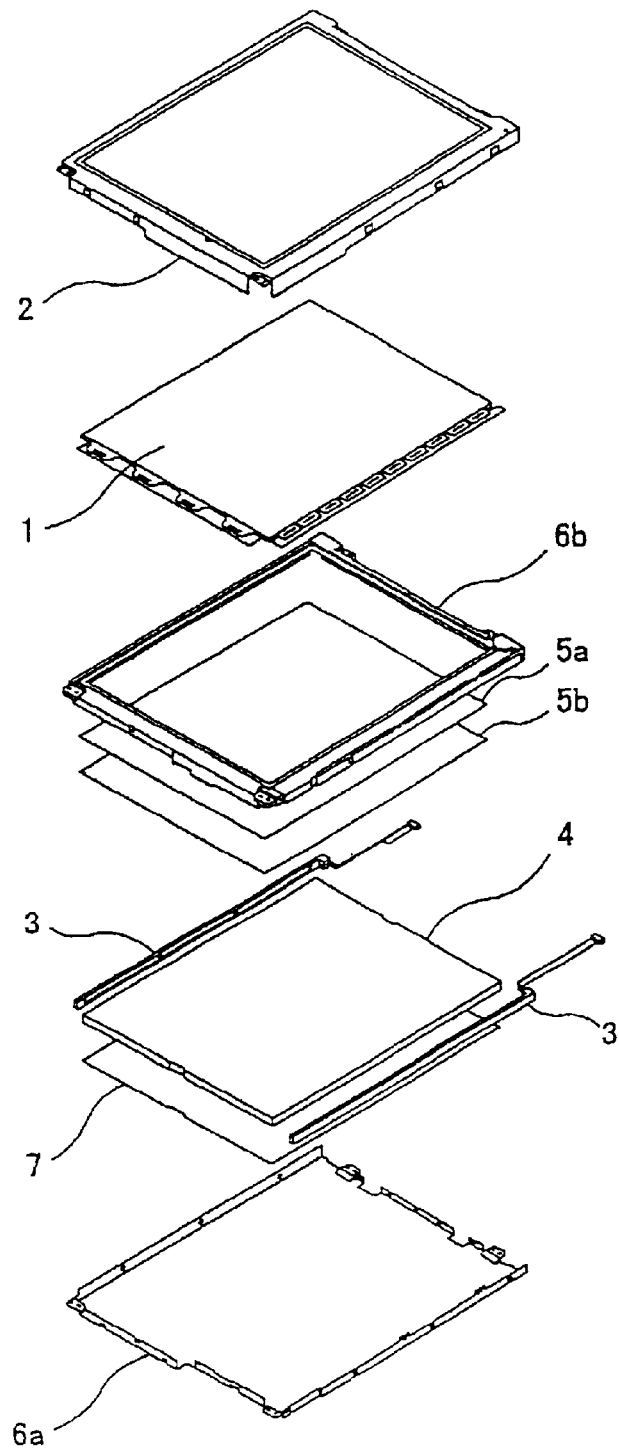
FIG. 1 is an exploded view of a conventional liquid crystal display device.

Although the liquid crystal display device according to the first embodiment of the present invention has the same basic structure as the liquid crystal display device shown in FIG. 1, a configuration of optical sheets and a lower backlight housing are different. That is, in the backlight device of the liquid crystal display device according to the present embodiment, as shown in FIG. 4A, optical sheets 10a and 10b is provided with protruding parts 10a-1 and 10b-1, respectively, and the lower backlight housing 12 is provided with a housing aperture 12a.

A housing 2 as a decorative panel is formed in the shape of a box by a metal plate, such as a stainless steel plate, an iron plate or an aluminum plate, and has a function to reinforce a liquid crystal panel 1 accommodated in the housing 2. The optical sheets 10a and 10b are provided under the liquid crystal panel 1, and a light-guiding plate 4 is provided under the optical sheets 10a and 10b. The light-guiding plate 4 is formed of a highly transparent resin such as acrylic resin, and has a function to lead a light from a light source 3 to the liquid crystal panel 1. The optical sheets 10a and 10b are thin sheets which apply optical processing such as divergence or convergence to the light led to the liquid crystal panel 1.

The light source 3, which consists of a fluorescence tube, is arranged on each side of the light-guiding plate 4 so as to project a light toward a light incidence end surface of the light-guiding plate 4. The light emitted from the light source 3 in a direction opposite to the liquid crystal panel 1 is reflected by a reflecting plate 7. Thereby, the great portion of the light incident on the light-guiding plate 4 exits toward the liquid crystal panel 1.

The optical sheets 10a and 10b, the light-guiding plate 4, the reflecting plate 7 and the light source 3 are accommodated between an upper backlight housing 6a and a lower backlight housing 12, thereby constituting a backlight device. The upper backlight housing 6a and the lower backlight housing 12 are formed as a resin mold component such as polycarbonate, or formed of a metal plate such as a stainless steel plate, an iron plate or an aluminum plate. The backlight device is attached to a housing 2 so as to be located under the liquid crystal panel 1.

The optical sheets 10a and 10b provided with the protruding parts 10a-1 and 10b-1 are arranged, when assembled as a backlight device, in a position corresponding to a housing aperture 12a of the backlight housing 12. That is, the housing aperture 12a is an opening provided in the backlight housing 12, and is configured so that the protruding parts 10a-1 and 10b-1 can be visually recognized from outside through the housing aperture 12a. Therefore, it can be inspected whether the optical sheets 10a and 10b are incorporated by checking whether the protruding parts 10*a*-1 and 10*b*-1 exist in the housing aperture 12*a* after the assembly of the liquid crystal display device.

In the above-mentioned structure, although the two optical sheets 10*a* and 10*b* are provided, if the protruding parts 10*a*-1 and 10*b*-1 are located in a completely overlapping position, the protruding part 10*a*-1 is covered by the protruding part 10*b*-1, which causes difficulty in the visual check of the optical sheets. In such a case, existence of the two optical sheets 10*a* and 10*b* can be easily checked by providing the protruding parts 10*a*-1 and 10*b*-1 in different positions so as to not overlap with each other. Thereby, when the liquid crystal display device is assembled without incorporating both or one of the optical sheets 10*a* and 10*b*, it can be easily recognized by a visual inspection, and the quality of the liquid crystal display device is prevented from falling due to both or one of the optical sheets not having been incorporated.

Moreover, it can also be checked easily whether or not the optical sheets 10*a* and 10*b* are incorporated with the front and back surfaces in a proper state by providing the protruding parts 10*a*-1 and 10*b*-1 in an asymmetrical position with respect to a center line of the optical sheets 10*a* and 10*b*. That is, by providing the protruding parts 10*a*-1 and 10*b*-1 in the asymmetrical position which is offset from the center line of the optical sheets 10*a* and 10*b*, when the optical sheets 10*a*-1 and 10*b*-1 are incorporated upside down, the position of the protruding parts 10*a*-1 and 10*b*-1 is on the opposite side with respect to the center line, which causes the protruding parts 10*a*-1 and 10*b*-1 disappear from the housing aperture 12*a*. Therefore, it can be easily checked by a visual inspection whether or not the optical sheets 10*a* and 10*b* are assembled with the front and back surfaces being correctly positioned, and the quality of the liquid crystal display device is prevented from falling due to the optical sheets 10*a* and 10*b* having been incorporated with upside down.

Figure 5:
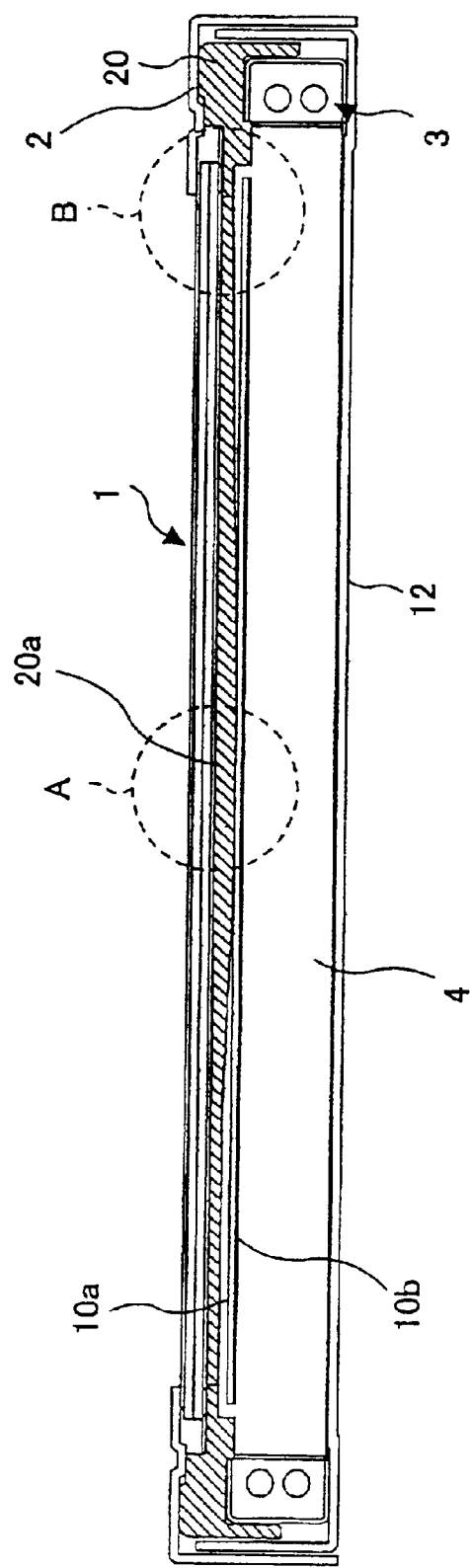
FIG. 5 is a cross-sectional view of a liquid crystal display device according to a second embodiment of the present invention.

A description will now be given, with reference to FIG. 5, of a second embodiment of the present invention. FIG. 5 is a cross-sectional view of the liquid crystal display device by the second embodiment of the present invention. In FIG. 5, parts that are the same as the parts shown in FIG. 4 are given the same reference numerals, and descriptions thereof will be omitted.

As shown in FIG. 5, the liquid crystal display device according to the present embodiment has the same structure as the liquid crystal display device shown in FIG. 4 except for the difference regarding the configuration of an upper backlight housing 20. That is, the upper backlight housing 20 shown in FIG. 5 is constituted by a resin frame, and a protruding part 20*a* is formed on a surface of the housing 20 which faces the optical sheet 10*a*. The protruding part 20*a* is formed in a center portion of the backlight housing 20 in FIG. 5, and is formed so as to protrude toward the optical sheet 10*a*. For example, if a total thickness of the two optical sheets 10*a* and 10*b* is 0.58 mm, a distance between the center portion of the protruding part 20*a* and the light-guiding plates 4 is set to be 0.6 mm, while a distance between the backlight housing 20 and the light-guiding plate 4 is set to be 0.7 mm in portions other than the protruding part 20*a*. Here, the distance between the center portion of the protruding part 20*a* and the light-guiding plates 4 and the distance between the backlight housing 20 and the light-guiding plate 4 correspond to gaps in which the optical sheets 10*a* and 10*b* are arranged.

Figure 6:
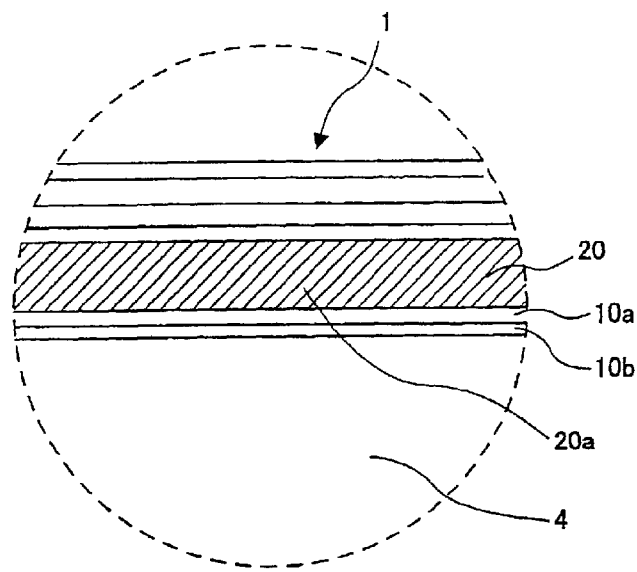
FIG. 6 is an enlarged view of a part indicated by a dotted circle A of FIG. 5.
Figure 7:
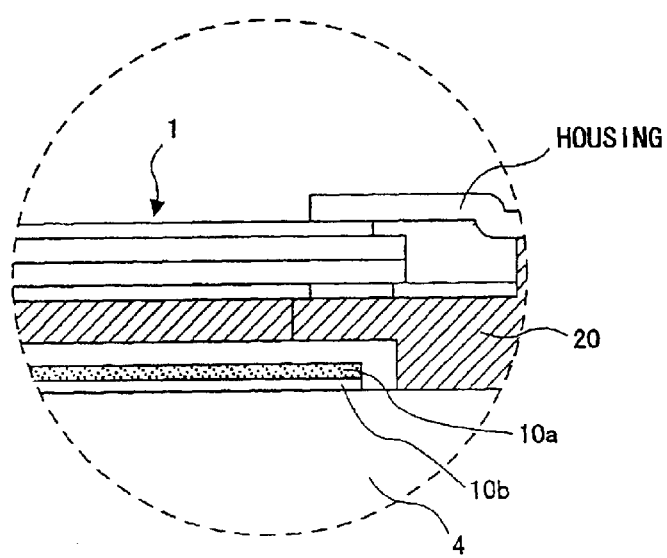
FIG. 7 is an enlarged view of a part indicated by a doted circle B of FIG. 5.

FIG. 6 is an enlarged view of a part indicated by a dotted circle A of FIG. 5, and FIG. 7 is an enlarged view of a part indicated by a doted circle B of FIG. 5. As shown in FIG. 6, the protruding part 20*a* of the center portion of the upper backlight housing 20 formed by a resin frame is arranged in a state where there is almost no gap between the protruding part 20*a* and the optical sheets 10*a* and 10*b* arranged on the light-guiding plate 4. On the other hand, as shown in FIG. 7, in the end part of the optical sheet, a predetermined gap is formed between the back surface of the backlight housing 20 and the optical sheet 10*a*.

Figure 8:
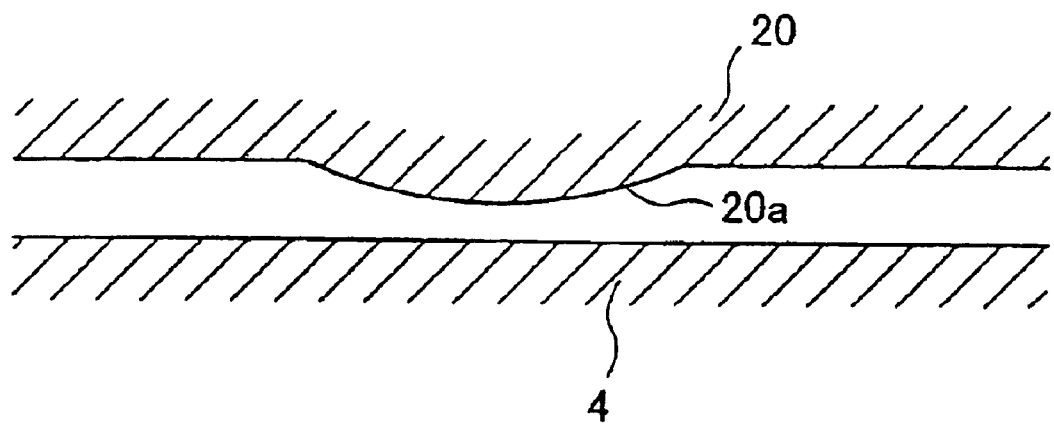
FIG. 8 is an illustration showing a protruding part.

FIG. 8 is an illustration showing the configuration of the protruding part 20*a*. As shown in FIG. 8, the protruding part 20*a* is formed in a round shape such as, for example, an arc of a large radius. It is preferable that the length of a part in which the protruding part 20*a* is formed is about ¼ of the length of the optical sheet.

In the above structure, when the optical sheet expands thermally, there is no space in which a bent portion is formed since the center portion is provided with the protruding part 20*a*. For this reason, generation of bending will be concentrated and toward the end of the optical sheet.

Figures 2A, 2B:
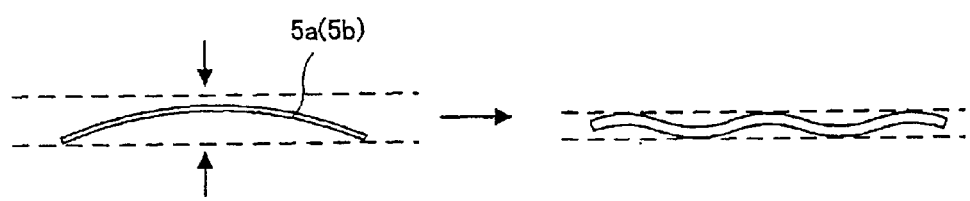
FIGS. 2A and 2B are illustrations of an optical sheet for explaining a mode of deformation.

Here, since the protruding part 20*a* is formed with a smooth roundness, the optical sheet will bend in accordance with the configuration of the protruding part 20*a*, and bending of fine waves as shown in FIG. 2B hardly occurs. Therefore, generation of unevenness in the brightness due to fine waves of the optical sheet can be prevented.

Figure 9:
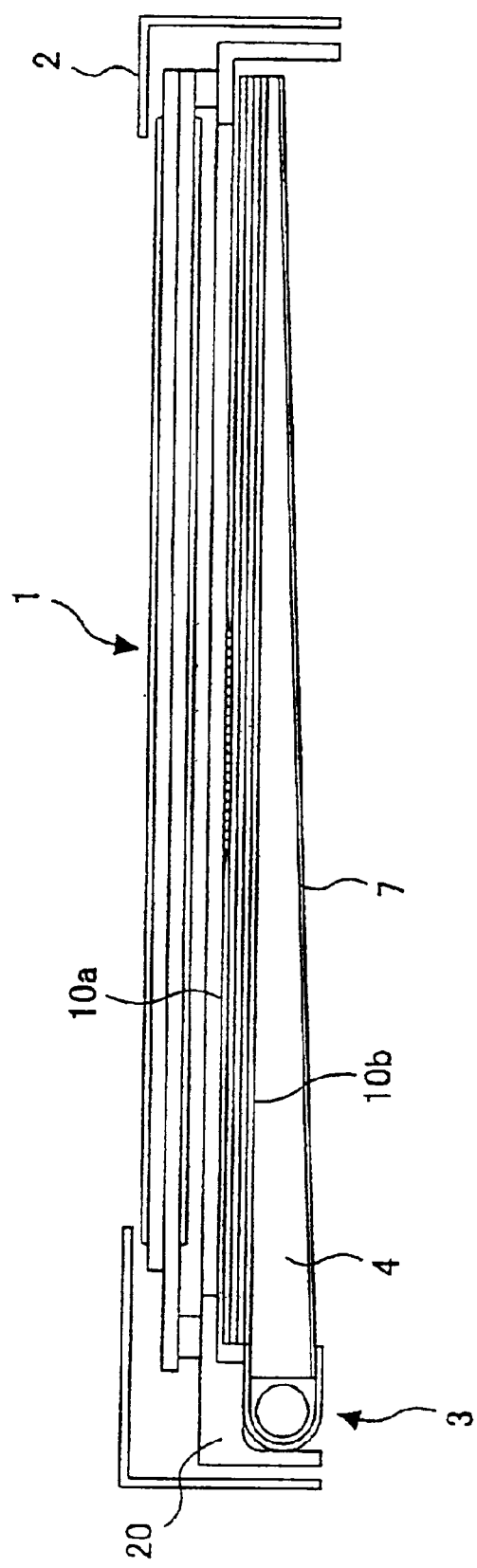
FIG. 9 is a cross-sectional view of a liquid crystal display device according to a variation of the liquid crystal display device shown in FIG. 5.

FIG. 9 is a cross-sectional view of a liquid crystal display device, which is a variation of the liquid crystal display device shown in FIG. 5. In the liquid crystal display device shown in FIG. 9, the light source 3 is provided on only one side of the light-guiding plate 4. The backlight housing 20 is provided with the protruding part 20*a* similar to the liquid crystal display device shown in FIG. 5.

Figure 10:
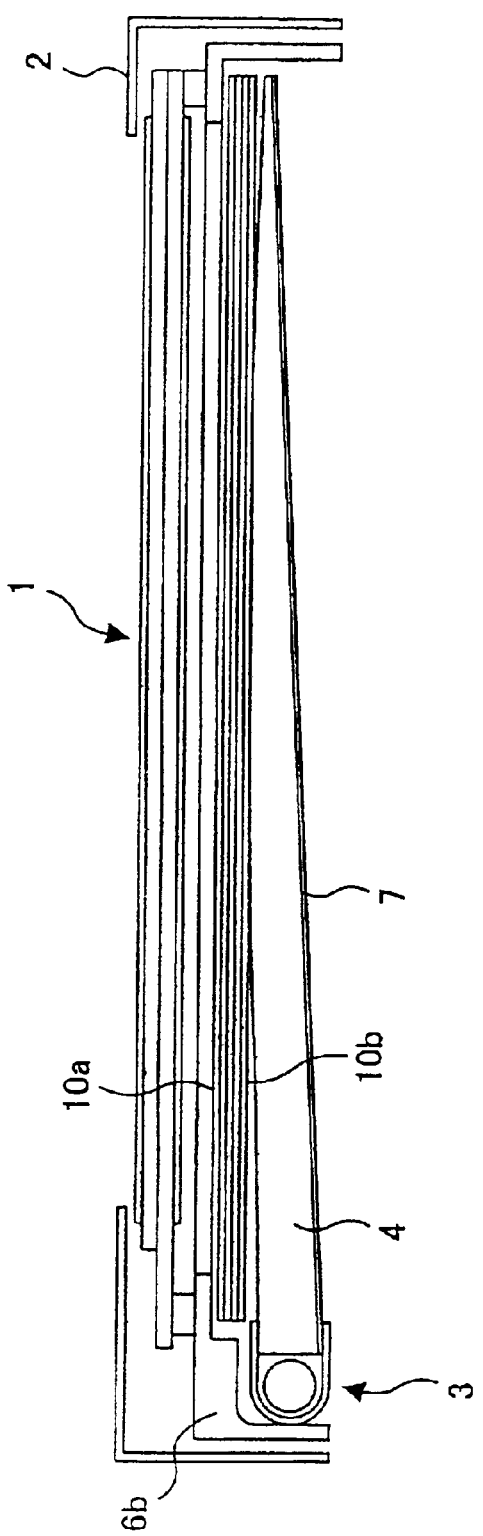
FIG. 10 is a cross-sectional view of a liquid crystal display device according to another variation of the liquid crystal display device shown in FIG. 5.

FIG. 10 is a cross-sectional view of a liquid crystal display device, which is another variation of the liquid crystal display device shown in FIG. 5. The liquid crystal display device shown in FIG. 10 has a smoothly bent surface on which the optical sheet of the light-guiding plate 4 is arranged in the liquid crystal display device shown in FIG. 9 instead of providing the protruding part 20*a*. Also according to such a structure, an effect similar to the case in which the protruding part 20*a* is provided can be obtained.

A description will now be given of a third embodiment of the present invention.

First, a description will be given of a mode of heat radiation from a fluorescent tube is explained.

Generally, heat moves from a body to other bodies according to three kinds of forms, heat conduction, heat transfer and heat radiation. In the backlight device of a side light system as shown in FIG. 1, the luminescence section of the fluorescent tube is arranged in the closed narrow space between the reflector and the light-guiding plate. For this reason, there are few amounts of movements of the heat according to convection of air around the luminescence section.

Moreover, since the emissivity of the inner surface of the reflector is close to 1, the reflector hardly absorbs radiation heat. Therefore, a large part of the heat emitted from the fluorescent tube reaches the reflector according to heat conduction in the air layer surrounding the fluorescent tube. Further, the electrode section of the fluorescent tube is surrounded by the fluorescent tube support section, and the heat generated in the electrode section of the fluorescent tube reaches the reflector according to heat conduction through the fluorescent tube support section.

As mentioned above, a large part of heat from the fluorescent tube is transmitted to the reflector according to heat conduction, and is emitted further to outside from the reflector. Here, an amount Q [W] of heat, which moves according to heat conduction, can be expressed by the following equation.

$$Q = \lambda/\delta (Ti - To) A \; [W]$$

In the above equation, λ represents a thermal conductivity [W/(m·K)] of a medium through which heat moves, δ represents a thickness [m] of the medium, Ti and To express a wall-surface temperature [K] of the medium, and A represents a cross-sectional area [m²] of the medium.

When surrounded by an air layer like the luminescence section of the fluorescent tube, an amount of heat release, that is, an amount Q of transfer of heat can be adjusted by adjusting the thickness δ of the air layer since the thermal conductivity of air is almost constant, 0.026 [W/(m·K)]. Namely, what is necessary is to adjust a distance between the luminescence section of the fluorescent tube and the reflector. Moreover, an amount of heat released from the electrode section can be adjusted by adjusting a thickness of the fluorescent tube support member.

Therefore, in order to adjust the amount of heat release by both the luminescence section and the electrode section of the fluorescent tube, it is necessary to adjust independently both the distance between the inner surface of the reflector and the luminescence section of the fluorescent tube and the distance between the inner surface of the reflector and the electrode section of the fluorescent tube. Such an adjustment can be achieved by providing a step to the reflector.

Figure 11:
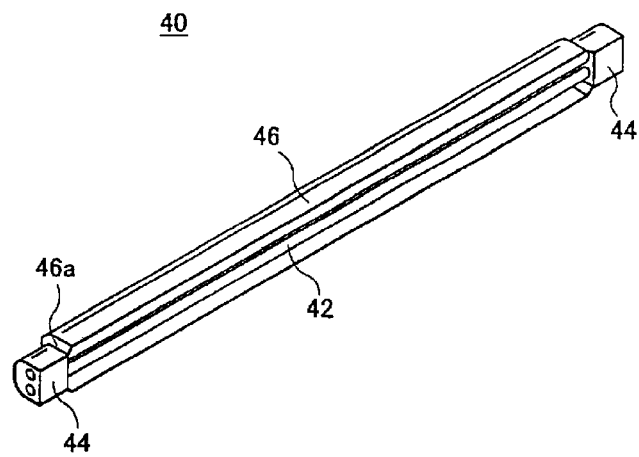
FIG. 11 is a perspective view of a light source provided in a liquid crystal display device according to a third embodiment of the present invention.

FIG. 11 is a perspective view of the light source provided in the liquid crystal display device according to the third embodiment of the present invention. The light source 40 shown in FIG. 11 is provided instead of the light source 3 shown in FIG. 3.

Figure 3:
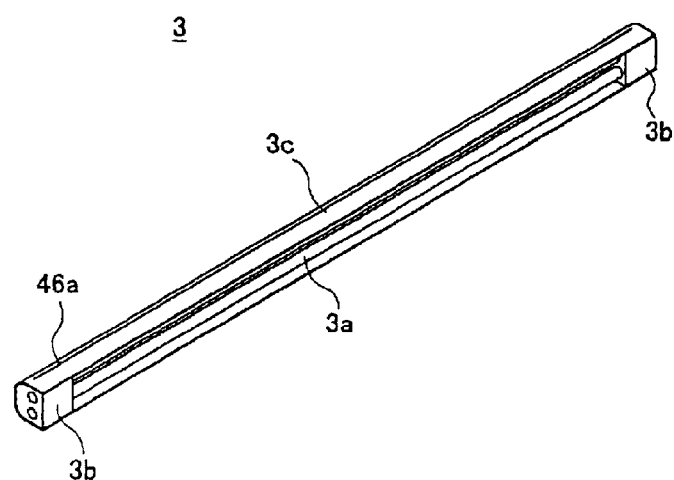
FIG. 3 is a perspective view of a light source comprising fluorescence tubes.

In the light source 3 shown in FIG. 3, the reflector 3c has a uniform cross-sectional configuration, and is provided around the fluorescence tube 3a and the fluorescent tube support members 3b. On the other hand, in the light source 40 shown in FIG. 11, the cross-sectional configuration of a reflector 46 differs between a portion surrounding fluorescent tubes 42 and a portion surrounding fluorescent tube support members 44.

Figure 12:
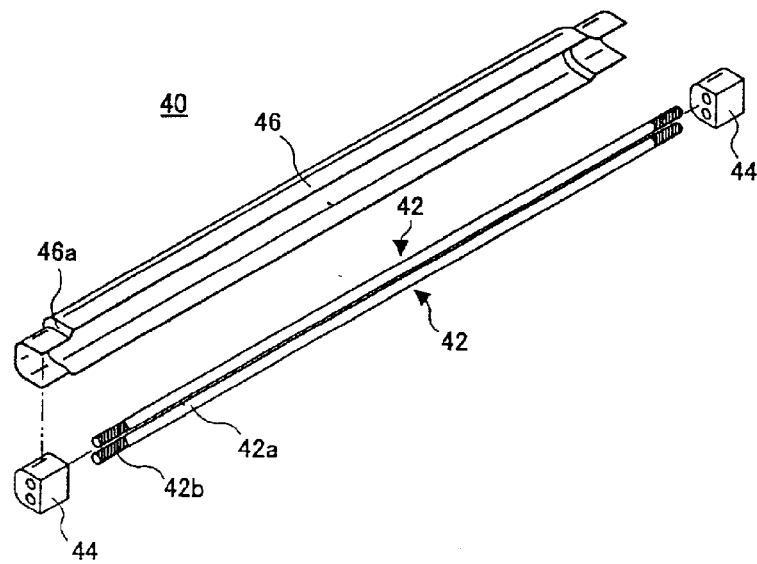
FIG. 12 is a perspective view of the light source shown in FIG. 11.

FIG. 12 is an exploded perspective view of the light source 40. A step part 46a is formed in the vicinity of each end of the reflector 46 so that the fluorescent tube support member 44 is provided to a portion between the step part 46a and the end of the reflector 46. Therefore, the fluorescent tubes 42 are provided in a portion between the opposite step parts 46a of the reflector 46.

In the light source 40 having the reflector 46 of the above structure, heat emitted from a glass tube heat-emitting section (luminescence section) 42a of the fluorescent tube 42 reaches the reflector 46 through the air layer around the fluorescent tube 42, and is further released outside from the reflector 46. On the other hand, heat emitted from the electrode section 42b of the fluorescent tube 42 reaches the reflector 46 through the fluorescent tube support member 44, and is further released outside from the reflector 46.

As mentioned above, the step part 46a is provided between the portion of the reflector 46 surrounding the glass tube heat-emitting section 42a and the portion of the reflector 46 surrounding the fluorescent tube support member 44. Thereby, the distance between the inner surface of the reflector 46 and the fluorescent tube 42 are varied.

Figure 13:
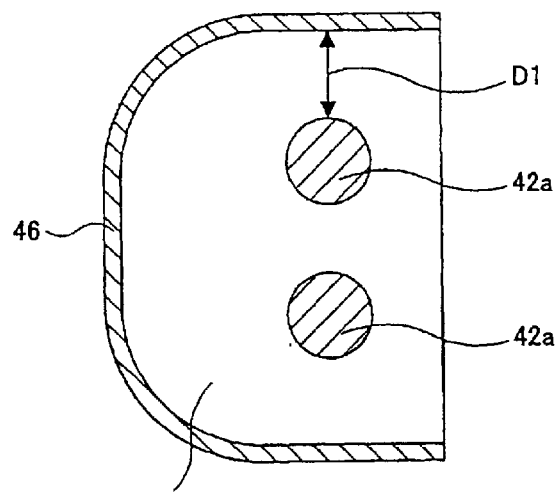
FIG. 13 is a cross-sectional view of a part corresponding to a periphery of a glass tube heat-emitting section of a reflector.
Figure 14:
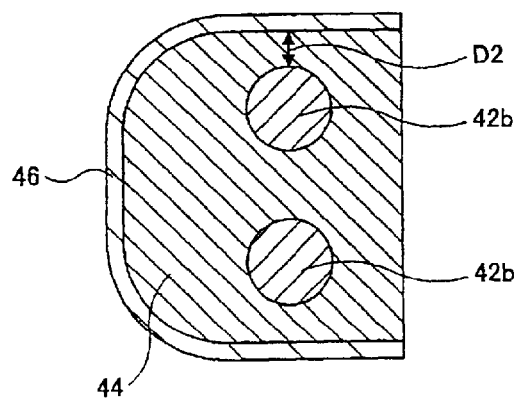
FIG. 14 is a cross-sectional view of a part corresponding to a periphery of a fluorescent tube support member of the reflector.
Figure 15:
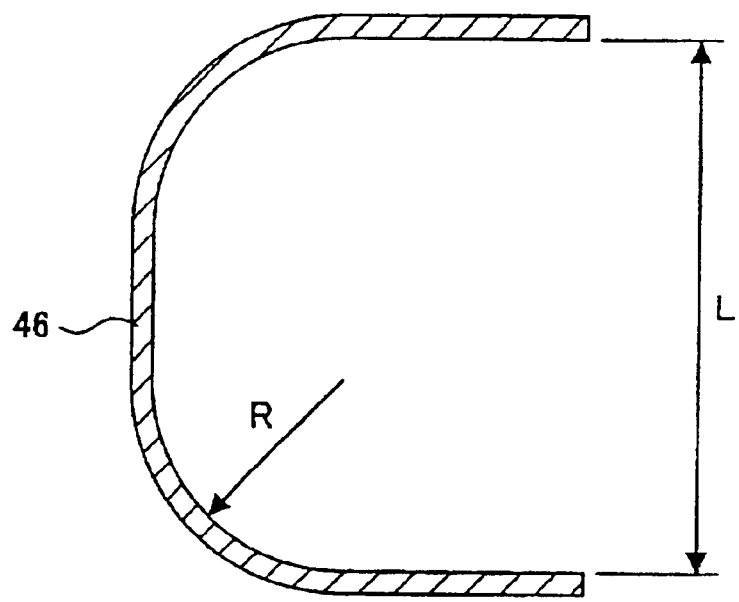
FIG. 15 is a cross-sectional view of the reflector.

FIG. 13 is a cross-sectional view of the portion of the reflector which portion surrounds the glass tube heat-emitting part 42a. FIG. 14 is a cross-sectional view of the reflector 46 which portion surrounds the fluorescent tube support member 44. The distance between the inner surface of the reflector 46 and the fluorescent tube 42 is indicated by D1 in FIG. 13 and D2 in FIG. 14. Adjustment of the distances D1 and D2 is made by changing a length L of an opening and a radius R of curvature of a bent portion of the reflector 46 as shown in FIG. 15.

In the fluorescent tube, since an amount of heat generated in the electrode section is larger than an amount of heat generated in the luminescence section, the distance D2 shown in FIG. 14 is set smaller than the distance D1 shown in FIG. 13. That is, it is constituted so that an amount of heat released from the electrode section 42b of the fluorescent tube 42 is larger than an amount of heat released from the luminescence section 42a.

Moreover, the fluorescent tube support member 44 is preferably made of an insulating material having a high thermal conductivity equal to or more than 0.5 [W/(m·K)] so as to increase the heat release efficiency. As for such an insulating material, a commercially available silicone sealant having a high heat conductivity, for example, 1.59 [W/(m·K)] may be used.

Moreover, in order to increase a heat release efficiency of the reflector 46, the reflector is preferably made of metal or a material having a heat conductivity equivalent to metal.

As mentioned above, the temperature of the fluorescent tube can be adjusted with high accuracy by adjusting an amount of heat release based on the amount of heat release which varies between portions of the fluorescent tube. Thus, the temperature of the luminescence section of the luminescent tube can be adjusted to maintain a temperature at which the maximum luminescence efficiency is obtained.

Moreover, since the temperature of the electrode section can be lowered by increasing an amount of heat released from the electrode section of fluorescent tube, the temperature of a solder connecting part provided to the fluorescent tube support member can also be lowered, thereby improving the reliability of the solder connecting part. Furthermore, the light-guiding plate and the plastic frame arranged around the fluorescent tube are prevented from thermal deformation and thermal degradation.

The present invention is not limited to the specifically disclosed embodiments, and variations and modifications may be made without departing from the scope of the present invention.

The present application is based on Japanese priority application No. 2001-236400 filed on Aug. 3, 2001, the entire contents of which are hereby incorporated by reference.

What is claimed is:

1. A liquid crystal display device irradiating a light of a light source from a backside of a liquid crystal panel, the liquid crystal display device comprising:

the liquid crystal panel;

a light-guiding plate provided under said liquid crystal panel for guiding the light of said light source to said liquid crystal panel by transmitting the light therethrough;

at least one optical sheet arranged between said liquid crystal panel and said light-guiding plate; and a backlight housing accommodating said light-guiding plate and said optical sheet, wherein said optical sheet is located within a gap formed between said backlight housing and said light-guiding plate, and a center of said optical sheet is nearer to an opposing surface of said backlight housing across said gap than is an end of said optical sheet.

2. A liquid crystal display device irradiating a light of a light source from a backside of a liquid crystal panel, the liquid crystal display device comprising:

the liquid crystal panel;

a light-guiding plate provided under said liquid crystal panel for guiding the light of said light source to said liquid crystal panel by transmitting the light therethrough;

at least one optical sheet arranged between said liquid crystal panel and said light-guiding plate; and a backlight housing accommodating said light-guiding plate and said optical sheet, wherein said optical sheet is located within a gap formed between said backlight housing and said light-guiding plate, and a width of said gap at the center of said optical sheet is smaller than a width of said gap at an end of said optical sheet, further wherein said backlight housing has a protruding part formed in said middle of a surface facing said light-guiding plate, and a width of said gap at the center of said optical sheet is equal to a distance between said protruding part and said light-guiding plate.

3. A liquid crystal display device irradiating a light of a light source from a backside of a liquid crystal panel, the liquid crystal display device comprising:

the liquid crystal panel;

a light-guiding plate provided under said liquid crystal panel for guiding the light of said light source to said liquid crystal panel by transmitting the light therethrough;

at least one optical sheet arranged between said liquid crystal panel and said light-guiding plate; and a backlight housing accommodating said light-guiding plate and said optical sheet, wherein said optical sheet is located within a gap formed between said backlight housing and said light-guiding plate, and a width of said gap at the center of said optical sheet is smaller than a width of said gap at an end of said optical sheet, further wherein said protruding part has a length equal to one fourth of a length of said optical sheet.

* * * * *

UNITED STATES PATENT AND TRADEMARK OFFICE
CERTIFICATE OF CORRECTION

PATENT NO. : 7,072,006 B2 Page 1 of 1
APPLICATION NO. : 10/097780
DATED : July 4, 2006
INVENTOR(S) : Shinpei Nagatani and Hirofumi Miyamoto It is certified that error appears in the above-identified patent and that said Letters Patent is hereby corrected as shown below:

On the title page, item [75]:

Under Inventors, delete "Eiji Nitto" and "Koshu Yonemura"

Signed and Sealed this

Twelfth Day of December, 2006

JON W. DUDAS
*Director of the United States Patent and Trademark Office*